United States Patent
Linde

(10) Patent No.: US 12,023,289 B2
(45) Date of Patent: Jul. 2, 2024

(54) LOCKABLE WHEELS AND SUBJECT SUPPORT LIFTS INCLUDING A LOCKABLE WHEEL

(71) Applicant: Liko Research & Develoopment AB, Luleå (SE)

(72) Inventor: Marcus Linde, Öjebyn (SE)

(73) Assignee: LIKO Research & Development AB, Luleå (SE)

(*) Notice: Subject to any disclaimer, the term of this patent is extended or adjusted under 35 U.S.C. 154(b) by 276 days.

(21) Appl. No.: 17/568,764

(22) Filed: Jan. 5, 2022

(65) Prior Publication Data

US 2022/0125655 A1 Apr. 28, 2022

Related U.S. Application Data

(63) Continuation of application No. 16/450,241, filed on Jun. 24, 2019, now Pat. No. 11,234,879.

(Continued)

(51) Int. Cl.
*A61G 7/10* (2006.01)
*A61G 7/05* (2006.01)
(Continued)

(52) U.S. Cl.
CPC ......... *A61G 7/1046* (2013.01); *A61G 7/0528* (2016.11); *A61G 7/1023* (2013.01);
(Continued)

(58) Field of Classification Search
CPC .. A61G 7/1046; A61G 7/1023; A61G 7/1061; A61G 7/1048; A61G 7/1015; A61G 7/1017; A61G 7/0528; A61G 7/018; A61G 2203/36; B60B 33/026; B60B 33/0042; B60B 2900/551; B60B 2900/711; B60B 33/0005; B60B 33/0028; B60B 33/0049; B60B 33/006; B60B 33/0068; B60B 33/0076; B60B 2200/242; B60B 33/0092;
(Continued)

(56) References Cited

U.S. PATENT DOCUMENTS 5,083,341 A 1/1992 Milbredt et al.
8,499,413 B1 8/2013 Tsai
(Continued)

FOREIGN PATENT DOCUMENTS

AU 2006200945 A1 * 9/2006 ......... B60B 33/0007

*Primary Examiner* — Justin C Mikowski
*Assistant Examiner* — Madison Emanski
(74) *Attorney, Agent, or Firm* — Dinsmore & Shohl LLC

(57) ABSTRACT

A subject support lift includes a mast portion, a base portion, and a lockable wheel assembly coupled to the base portion. The lockable wheel assembly includes an axle member, a lockable wheel coupled to the axle member, and a pivot member pivotally coupled to the lockable wheel and defining an axis extending in a vertical direction, where the lockable wheel is rotatable about the axis defined by the pivot member. A locking member is coupled to one of the pivot member or the lockable wheel, the locking member being repositionable between a locked position, in which the locking member engages the other of the pivot member or the lockable wheel, and an unlocked position, in which the locking member is spaced apart from the other of the pivot member or the lockable wheel.

16 Claims, 8 Drawing Sheets

Related U.S. Application Data

(60) Provisional application No. 62/692,035, filed on Jun. 29, 2018.

(51) Int. Cl.
 B60B 33/00 (2006.01)
 B60B 33/02 (2006.01)
 B62B 3/00 (2006.01)

(52) U.S. Cl.
 CPC ...... B60B 33/0049 (2013.01); B60B 33/0057 (2013.01); B60B 33/0068 (2013.01); B60B 33/026 (2013.01); B62B 3/001 (2013.01); *A61G 2203/36* (2013.01); *B60B 33/0042* (2013.01)

(58) Field of Classification Search
 CPC .............. B60B 33/021; B60B 2200/26; B60B 2900/331; B60B 33/0057; B60B 33/0094; B60B 33/02; A47C 7/006; A61H 3/04; A61H 2003/046; A61H 2003/043; A61B 50/13; A61B 50/10
 USPC .............................................................. 5/86
 See application file for complete search history.

(56) References Cited

U.S. PATENT DOCUMENTS

| | | | |
|---|---|---|---|
| 8,522,397 B1* | 9/2013 | Tsai | B60B 33/026 16/35 R |
| 10,376,434 B2 | 8/2019 | Andersson et al. | |
| 2009/0085317 A1 | 4/2009 | Livengood et al. | |
| 2012/0042472 A1* | 2/2012 | Aubin | B60B 33/0018 16/46 |
| 2012/0174314 A1* | 7/2012 | Clement | A61G 7/1051 5/81.1 R |
| 2016/0052339 A1 | 2/2016 | Dayt | |
| 2016/0288568 A1* | 10/2016 | Brøndum | A61G 7/1046 |
| 2017/0119607 A1 | 5/2017 | Derenne et al. | |
| 2019/0143748 A1 | 5/2019 | Lai | |
| 2019/0254895 A1* | 8/2019 | Afshani | A61G 7/1038 |
| 2019/0308450 A1 | 10/2019 | Rottenau et al. | |
| 2019/0358997 A1 | 11/2019 | Chou | |

* cited by examiner

LOCKABLE WHEELS AND SUBJECT SUPPORT LIFTS INCLUDING A LOCKABLE WHEEL

CROSS-REFERENCE TO RELATED APPLICATIONS

This application is a continuation of U.S. Non-Provisional patent application Ser. No. 16/450,241, entitled "Lockable Wheels and Subject Support Lifts Including a Lockable Wheel" and filed on Jun. 24, 2019, which claims the benefit of U.S. Provisional Patent Application No. 62/692,035, entitled "Lockable Wheels and Subject Support Lifts Including a Lockable Wheel" and filed on Jun. 29, 2018, the entireties of which are incorporated by reference herein.

BACKGROUND

Field

The present specification generally relates to subject support lifts including a lockable wheel and lockable wheels for use with subject support lifts.

Technical Background

Mobile lifts may be used in hospitals, other health care facilities, and home care settings to move a subject from one location to another or to assist in moving a subject from one location to another. Conventional mobile lifts utilize various accessories, such as a sling or other attachments to secure a subject to the mobile lift. An actuator of the mobile lift may lift the subject in a vertical direction so that the subject may be transported from one location to another. In one example, a caregiver may operate the mobile lift to raise the subject off a bed, reposition the subject by moving the mobile lift to a desired location, and then lower the subject at the destination.

When lifting a subject with a mobile lift, it is desirable to position the mobile lift directly over a center of mass of the subject. For example, when the center of mass of the subject is not positioned directly below the mobile lift, the subject may swing in a lateral and/or longitudinal direction when lifted, rather than moving only upward in the vertical direction. To address this issue, some conventional mobile lifts include pivoting wheels or casters that allow the mobile lift to move freely in the lateral and/or longitudinal direction. By moving in the lateral and/or longitudinal direction, the mobile lift may be repositioned over the center of mass of the subject as the subject is lifted. However, the pivoting wheels may make transporting the subject in the mobile lift difficult. For example, the pivoting wheels may provide minimal or no resistance to movement of the mobile lift in the lateral or longitudinal direction, making it difficult for a caregiver to push the mobile lift in a straight line, to navigate the mobile lift around an obstacle, or to otherwise move the mobile lift as desired.

Accordingly, a need exists for devices to assist in navigating subject support lift along a desired path.

SUMMARY

In one embodiment, a subject support lift includes a mast portion, a base portion, and a lockable wheel assembly coupled to the base portion, the lockable wheel assembly including an axle member, a lockable wheel coupled to the axle member and rotatable about an axle axis extending through the lockable wheel, a pivot member pivotally coupled to the lockable wheel and defining an axis extending in a vertical direction that is transverse to the axle axis, where the lockable wheel is rotatable about the axis defined by the pivot member, a locking member coupled to one of the pivot member or the lockable wheel, the locking member being repositionable between a locked position, in which the locking member engages the other of the pivot member or the lockable wheel, and an unlocked position, in which the locking member is spaced apart from the other of the pivot member or the lockable wheel, a cable coupled to the locking member, and a handle coupled to the cable, where the handle selectively moves the locking member between the locked position and the unlocked position.

In another embodiment, a subject support lift including a mast portion extending upward in a vertical direction, and a base portion positioned at a bottom end of the mast portion, the base portion including a lockable leg extending between a front end and a rear end, a lockable wheel assembly coupled to the lockable leg, the lockable wheel assembly including a pivot member coupled to the lockable leg, a lockable wheel pivotally coupled to the lockable leg at the pivot member, and a locking member repositionable between a locked position and an unlocked position, where the lockable wheel is rotatable with respect to the lockable leg about an axis extending through the pivot member in the vertical direction with the locking member in the unlocked position, and the lockable wheel is fixed with respect to the lockable leg about the axis extending through the pivot member with the locking member in the locked position.

In yet another embodiment, a method for supporting a subject with a subject support lift includes moving the subject support lift toward the subject, the subject support lift including a mast portion and a base portion, the base portion including a lockable leg and a lockable wheel pivotally coupled to the lockable leg, moving the lockable leg outward from a subject support lift centerline, connecting the subject to the subject support lift, lifting the subject with the subject support lift in a vertical direction, locking the lockable wheel such that the lockable wheel is fixed with respect to the lockable leg about an axis extending in the vertical direction, and moving the subject connected to the subject support lift in a direction transverse to the vertical direction.

Additional features of person lifting devices including lockable wheels described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
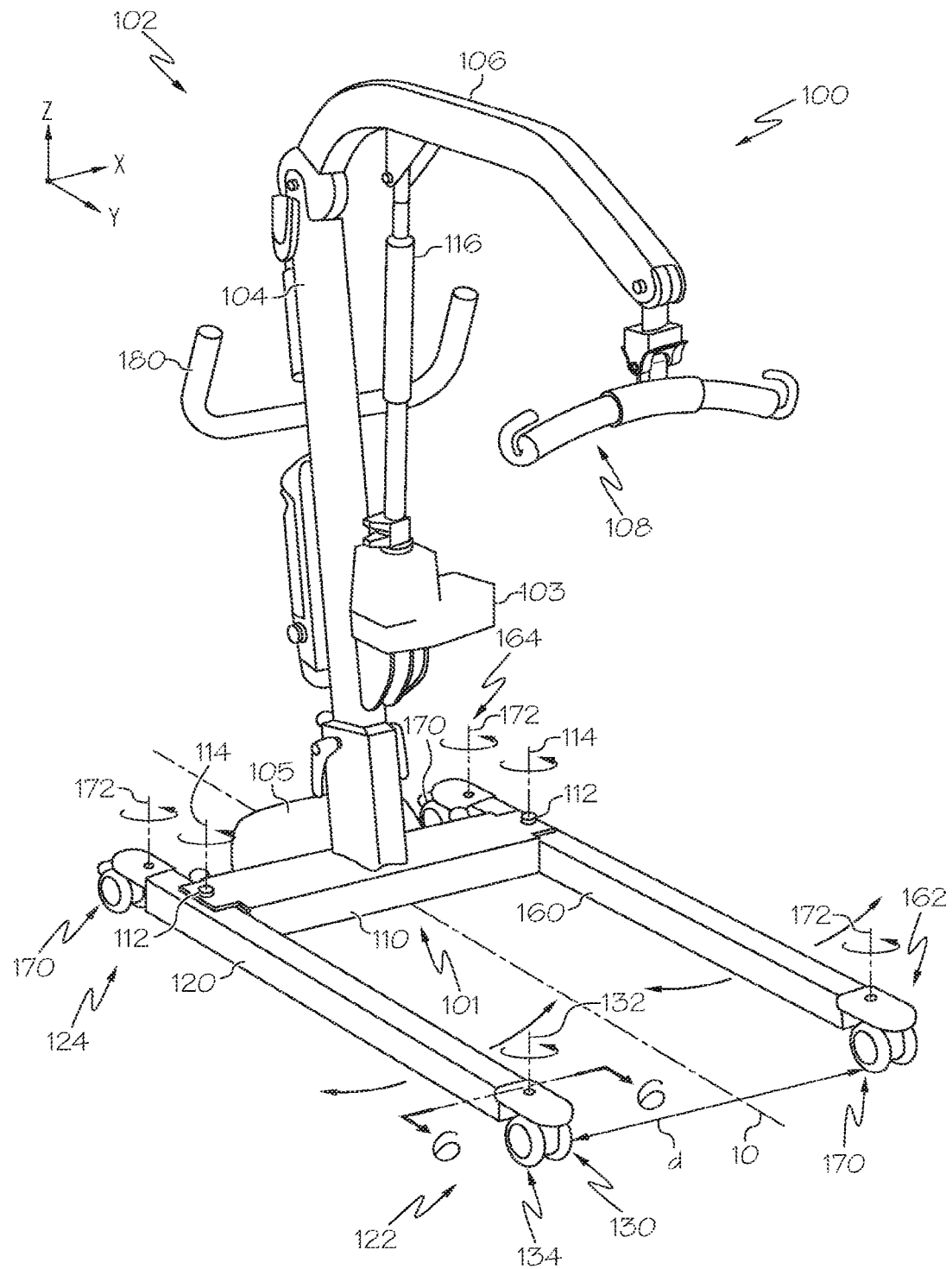
FIG. 1 schematically depicts a front perspective view of a subject support lift according to one or more embodiments shown and described herein.

Reference will now be made in detail to embodiments of lockable wheel assemblies and subject support lifts including lockable wheel assemblies, examples of which are illustrated in the accompanying drawings. Whenever possible, the same reference numerals will be used throughout the drawings to refer to the same or like parts. In embodiments, a subject support lift includes a mast portion extending upward in a vertical direction and a base portion positioned at a bottom end of the mast portion. The base portion includes a lockable leg extending between a front end and a rear end and a lockable wheel assembly including a pivot member coupled to the leg. The lockable wheel assembly includes a locking member and a lockable wheel pivotally coupled to the lockable leg at the pivot member, where locking member is repositionable between an unlocked position, in which the lockable wheel is rotatable with respect to the lockable leg about an axis extending through the pivot member in the vertical direction, and a locked position, in which the lockable wheel is fixed with respect to the lockable leg at the pivot member. Because locking member is selectively repositionable between a locked position and an unlocked position, the lockable wheel may be rotatable when lifting a subject, so that the subject support lift may freely move to position the subject support lift over the center of mass of the subject. The wheel may also be fixed with respect to the leg of the subject support lift in the locked position to resist movement of the lift in a lateral direction when moving the subject from one location to another. This and other embodiments of lockable wheels and subject support lifts including lockable wheels are described below with reference to the appended drawings.

As used herein, the term "longitudinal direction" refers to the forward-rearward direction of the components of the subject support lift (i.e., in the +/−Y-direction as depicted). The term "lateral direction" refers to the cross-wise direction of the components of the subject support lift (i.e., in the +/−X-direction as depicted), and is transverse to the longitudinal direction. The term "vertical direction" refers to the upward-downward direction of the components of the subject support lift (i.e., in the +/−Z-direction as depicted).

Figure 2:
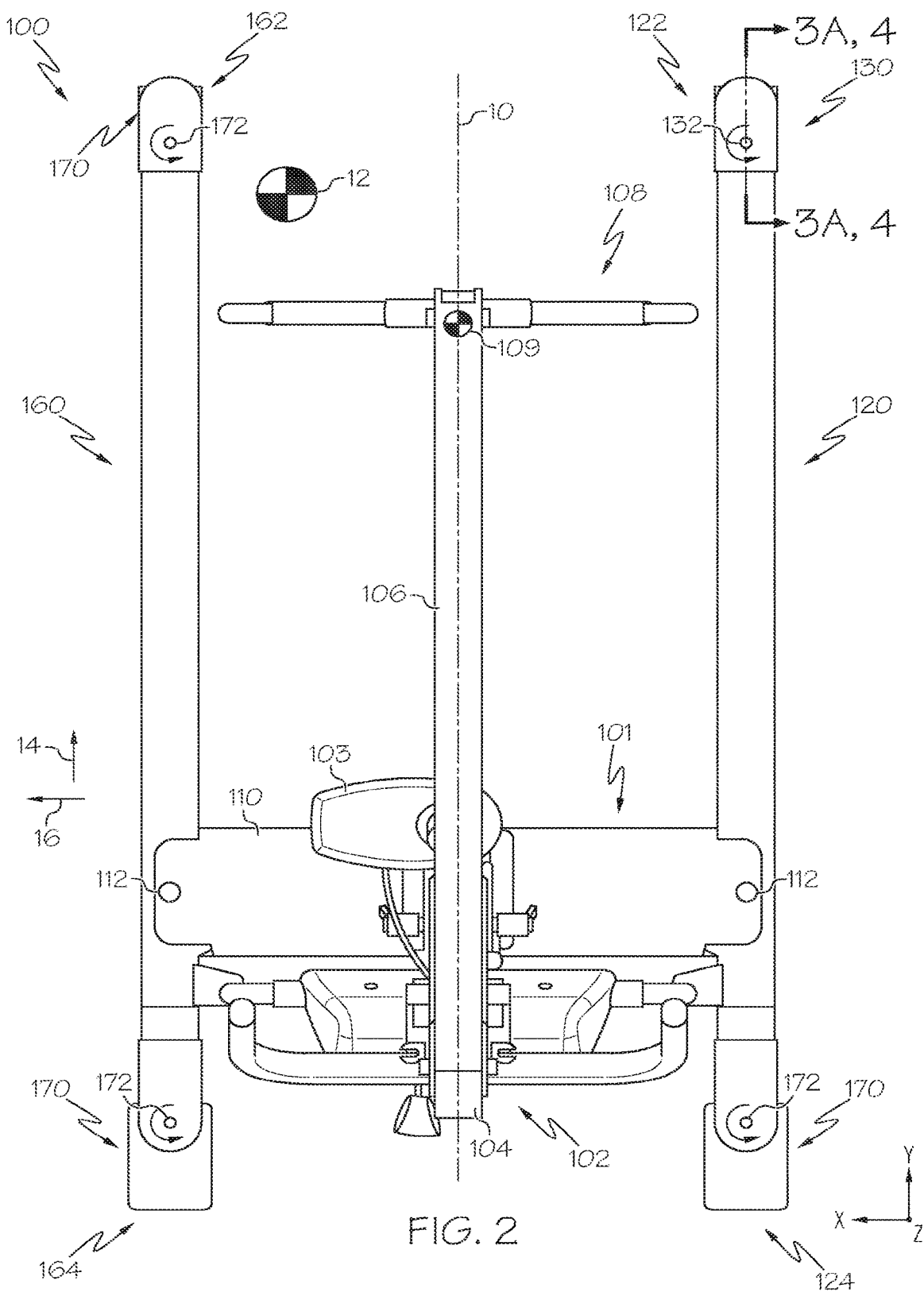
FIG. 2 schematically depicts a top view of the subject support lift of FIG. 1, according to one or more embodiments shown and described herein.

Referring initially to FIGS. 1 and 2, a front perspective view and a top view of a subject support lift 100 are schematically depicted, respectively. The subject support lift 100 generally includes a mast portion 102 extending upward in the vertical direction from a base portion 101. The mast portion 102 may include a vertical member 104 that generally extends upward in the vertical direction, and a horizontal member 106 that is pivotally coupled to and extends forward from the vertical member 104 in the longitudinal direction. The subject support lift 100 further includes a sling bar 108 that is selectively coupled to the horizontal member 106. The sling bar 108 may be utilized to selectively couple a subject support device (e.g., a sling, a vest, or the like) to the subject support lift 100.

In embodiments, the subject support lift 100 includes a motor 103 coupled to the mast portion 102 that moves the horizontal member 106 with respect to the vertical member 104. In particular, in the embodiment depicted in FIGS. 1 and 2, the motor 103 is positioned on the vertical member 104 and engaged with the horizontal member 106. As noted above, the horizontal member 106 may be pivotally coupled to the vertical member 104, and the motor 103 may move the horizontal member 106 about the pivot, thereby moving the horizontal member 106 in the vertical direction. By moving horizontal member 106 in the vertical direction, the motor 103 moves the sling bar 108 selectively coupled to the horizontal member 106 in the vertical direction. The motor 103 may include any suitable actuation device to move the horizontal member 106 with respect to the vertical member 104, such as a direct current (DC) electric motor, an alternating current (AC) motor, a pneumatically driven motor, a hydraulically driven motor, or the like. While the embodiment depicted in FIGS. 1 and 2 includes the motor 103 coupled to the vertical member 104 and engaged with the horizontal member 106, the motor 103 may be positioned at any suitable location of the subject support lift 100 to move the horizontal member 106 with respect to the vertical member 104. For example, the motor 103 may be coupled to the horizontal member 106 or the base portion 101 to move the horizontal member 106, and accordingly the sling bar 108, in the vertical direction. Furthermore, while the embodiment depicted in FIGS. 1 and 2 depicts a mast portion 102 including a vertical member 104 pivotally coupled to a horizontal member 106, it should be understood that the mast portion 102 may include any suitable construction to facilitate the selective movement of the sling bar 108 in the vertical direction. For example, in some embodiments, the vertical member 104 may include a telescoping design such that the vertical member 104 may be selectively extended and retracted in the vertical direction, and the motor 103 may move the vertical member 104 up and down in the vertical direction to move the sling bar 108 in the vertical direction.

The base portion 101 of the subject support lift 100 is positioned at a bottom end of the mast portion 102 and generally includes a base member 110 extending in the lateral direction, and a lockable leg 120 and a pivotable leg 160 that are each pivotally coupled to the base member 110. The base member 110 generally extends across a subject support lift centerline 10 that bisects the subject support lift 100 in the longitudinal direction.

In the embodiment depicted in FIGS. 1 and 2, the lockable leg 120 and the pivotable leg 160 are pivotally coupled to the base member 110 at respective pivot couplings 112. The lockable leg 120 extends between a rear end 124 and a front end 122 that is positioned opposite the rear end 124 in the longitudinal direction. Similarly, the pivotable leg 160 extends between a rear end 164 and a front end 162 that is positioned opposite the rear end 164 in the longitudinal direction. In embodiments, the lockable leg 120 and the pivotable leg 160 are repositionable between an extended position and a retracted position. In particular, the lockable leg 120 is pivotable about a pivot coupling axis 114 of the pivot coupling 112 that couples the lockable leg 120 to the base member 110. The lockable leg 120 is repositionable between an extended position and a retracted position, where the front end 122 of the lockable leg 120 is positioned closer to the subject support lift centerline 10 in the retracted position. Similarly, the pivotable leg 160 is pivotable about a pivot coupling axis 114 of the pivot coupling 112 that couples the pivotable leg 160 to the base member 110. The pivotable leg 160 is repositionable between an extended position and a retracted position, wherein the front end 162 is poisoned closer to the subject support lift centerline 10 in the retracted position. In embodiments, the lockable leg 120 and the pivotable leg 160 may be coupled to a motor 105 that selectively repositions the lockable leg 120 and the pivotable leg 160 between the extended position and the retracted position. In some embodiments, the motor 105 may simultaneously move both the lockable leg 120 and the pivotable leg 160 between the extended and the retracted positions. In other embodiments, the motor 105 may selectively move one or the other of the lockable leg 120 and the pivotable leg 160 between the extended and the retracted positions. By repositioning the lockable leg 120 and/or the pivotable leg 160 between an extended position and a retracted position, a distance d between the front end 122 of the lockable leg 120 and the front end 162 of the pivotable leg 160 may be increased or decreased. By increasing the distance d between the front ends 122, 162 of the pivotable leg 160 and the lockable leg 120, the pivotable leg 160 and the lockable leg 120 may straddle an object supporting a subject such that the sling bar 108 may be positioned over the subject. For example, a subject may be sitting on an object, such as chair, a toilet, or the like, and the pivotable leg 160 and the lockable leg 120 may be positioned on opposite sides to straddle the object such that the sling bar 108 may be positioned over the subject.

The pivotable leg 160 generally includes a pair of pivotable wheels 170 that are pivotally coupled to the front end 162 and the rear end 164 of the pivotable leg 160. The pivotable wheels 170 are generally rotatable about pivotable wheel axes 172 that extend in the vertical direction. The lockable leg 120 generally includes a pivotable wheel 170 pivotally coupled to the rear end 124 of the lockable leg 120, and a lockable wheel assembly 130 coupled to the front end 122 of the lockable leg 120. The pivotable wheel 170 pivotally coupled to the rear end 124 of the lockable leg 120 is generally rotatable about the pivotable wheel axis 172 extending in the vertical direction and the lockable wheel assembly 130 is also generally rotatable about an axis 132 that extends in the vertical direction. The lockable wheel assembly 130 is selectively repositionable between a locked position, in which the lockable wheel assembly 130 is fixed with respect to the lockable leg 120 about the axis 132, and an unlocked position, in which at least a portion of the lockable wheel assembly 130 is rotatable about the axis 132, as described in greater detail herein. While the embodiment depicted in FIGS. 1 and 2 includes the lockable wheel assembly 130 coupled to the front end 122 of the lockable leg 120, in other embodiments, the lockable wheel assembly 130 may be coupled to the rear end 124 of the lockable leg 120, and the lockable leg 120 may include a pivotable wheel 170 coupled to the front end 122 of the lockable leg 120.

Figure 3A:
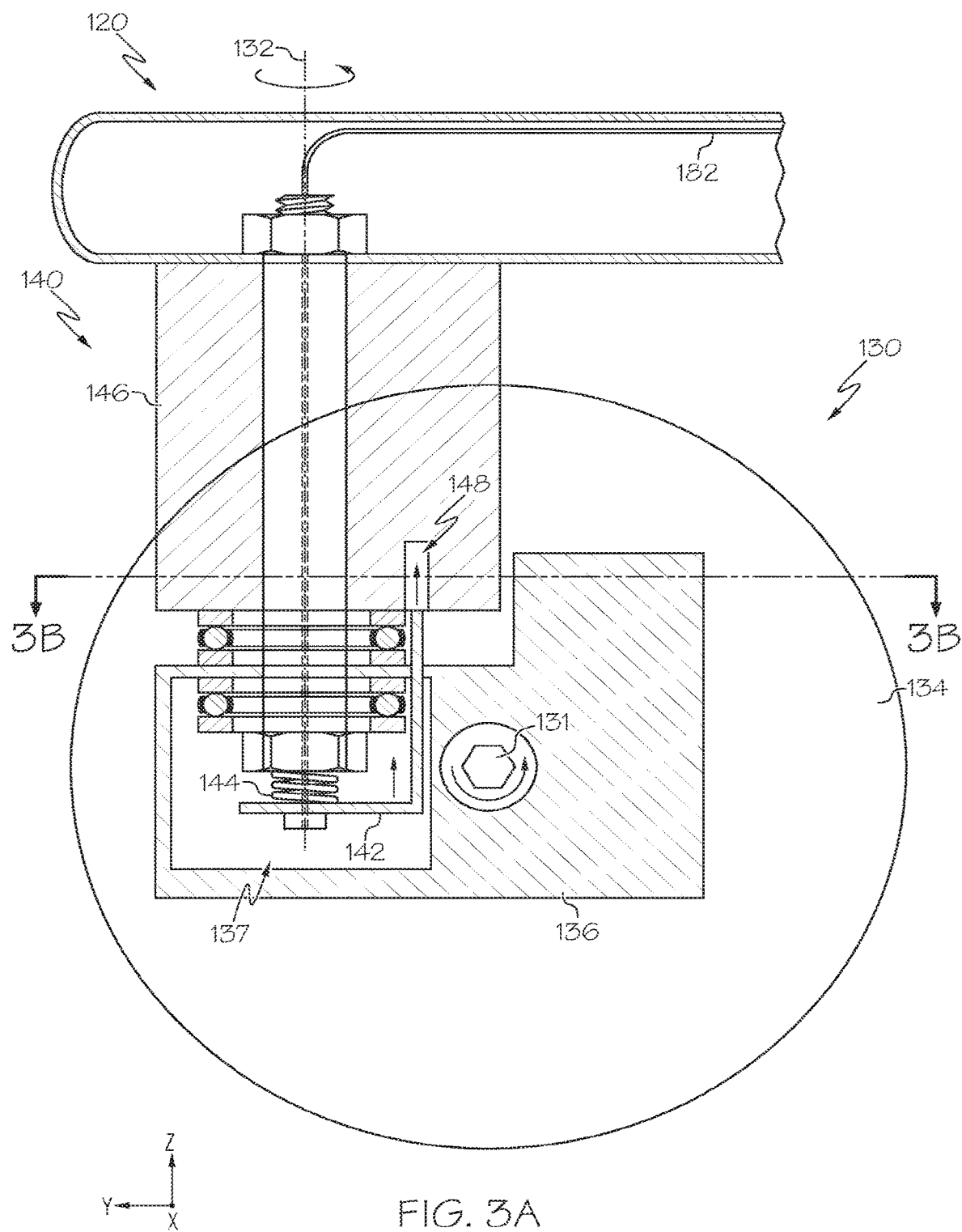
FIG. 3A schematically depicts a cross-section of a lockable wheel assembly of the subject support lift along section 3A-3A of FIG. 2, according to one or more embodiments shown and described herein.

Referring to FIG. 3A, a cross-section view of the lockable wheel assembly 130 along section 3A-3A of FIG. 2 is depicted. The lockable wheel assembly 130 is coupled to the lockable leg 120, and generally includes a pivot member 140 coupled to the lockable leg 120 and a lockable wheel 134 coupled to the pivot member 140. In the embodiment depicted in FIG. 3A, the pivot member 140 includes a connection portion 146 that is coupled to the lockable leg 120 and that defines a cavity 148 extending upward into the connection portion 146. The lockable wheel 134 is pivotally coupled to the lockable leg 120 through the connection portion 146, and the pivot member 140 may include one or more bearings positioned between the connection portion 146 and the lockable wheel 134 such that the lockable wheel 134 is selectively rotatable about the axis 132. The bearings may include any suitable bearings to permit rotation of the lockable wheel 134 with respect to the lockable leg 120, such as ball bearings, roller bearings, magnetic bearings, or the like.

Figure 3B:
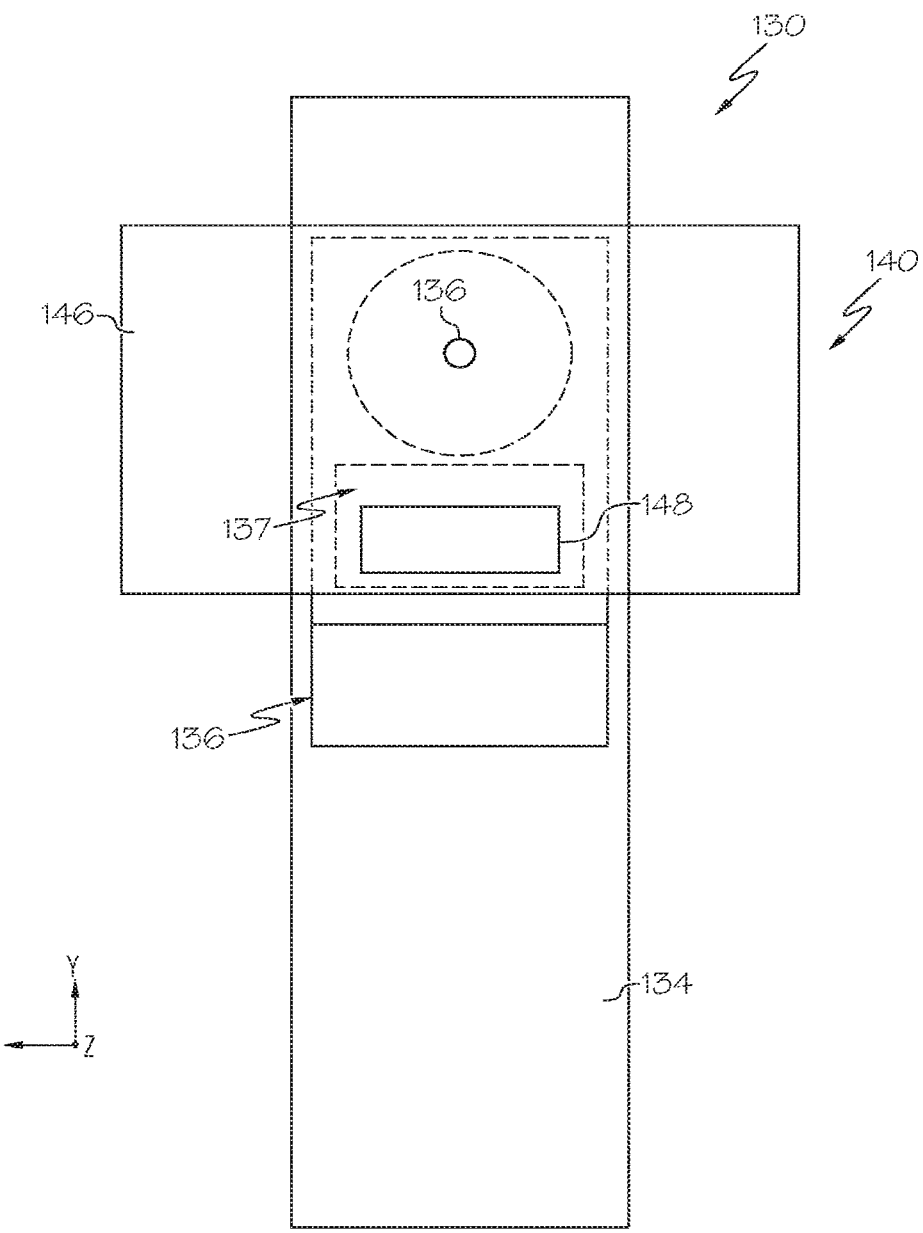
FIG. 3B schematically depicts a cross-section of the lockable wheel assembly of FIG. 3A along section 3B-3B of FIG. 3A, according to one or more embodiments shown and described herein.

Referring collectively to FIGS. 3A and 3B, the cross-section of the lockable wheel assembly 130 along section 3A-3A of FIG. 2 and a cross-section of the lockable wheel assembly 130 along section 3B-3B of FIG. 3A are depicted, respectively. The lockable wheel 134 is coupled to the connection portion 146 through an axle member 136 and the lockable wheel 134 is rotatable with respect to the axle member 136. In particular, the lockable wheel 134 is rotatable about an axle axis 131 that extends through the axle member 136 in the lateral direction as depicted, such that the lockable wheel 134 may rotate along a surface, such as a floor.

In embodiments, the lockable wheel assembly 130 includes a locking member 142 that is positioned at least partially within an axle cavity 137 defined by the axle member 136, such that the locking member 142 is rotatable about the axis 132 with the axle member 136 and the lockable wheel 134. The locking member 142 may be bounded by the axle cavity 137 in the longitudinal and the lateral directions as depicted, such that movement of the locking member 142 in the lateral and longitudinal direction is restricted by the axle cavity 137. In embodiments, the locking member 142 is coupled to a cable 182 that extends through the connection portion 146 and that is movable in the vertical direction, to move the locking member 142 in the vertical direction. The cable 182 may generally include any suitable structure to facilitate moving the locking member 142 in the vertical direction, and may include a metal wire, a nylon rope, a composite, or the like.

In some embodiments, the locking member 142 is engaged with a biasing member 144 that biases the locking member 142 in the vertical direction. The biasing member 144 may include any suitable construction to bias the locking member 142 in the vertical direction, and may include a tension spring, a torsion spring, or a compression spring. In some embodiments, the biasing member 144 biases the locking member 142 downward in the vertical direction. In other embodiments, the biasing member biases the locking member upward in the vertical direction.

The locking member 142 is repositionable between an unlocked position, as depicted in FIG. 3A and in which the locking member 142 is spaced apart from the cavity 148 of the connection portion 146, and a locked position, in which the locking member 142 is positioned at least partially within the cavity 148 of the connection portion 146. When at least a portion of the locking member 142 is positioned within the cavity 148 of the connection portion 146, movement of the locking member 142 with respect to the connection portion 146 may be restricted. In particular, the cavity 148 may bound the locking member 142 in the longitudinal direction and the lateral direction, thereby restricting movement of the locking member 142 with respect to the connection portion 146. As noted above, the locking member 142 is bounded by the axle cavity 137 in the longitudinal and the lateral directions. Accordingly, when the locking member 142 is positioned at least partially within the cavity 148, the locking member 142 is engaged with and bounded in the longitudinal and the lateral directions by both the connection portion 146 and the axle member 136. Because the locking member 142 is bounded by the cavity 148 of the connection member 146 and the axle cavity 137 of the axle member 136 in the longitudinal and the lateral directions, the axle member 136 is fixed with respect to the connection member 146 about the axis 132 when the locking member 142 is positioned at least partially within the cavity 148 of the connection member 146. By fixing the axle member 136 with respect to the connection member 146 about the axis 132, the lockable wheel 134 may be fixed with respect to the lockable leg 120 about the axis 132 through the axle member 136, the locking member 142, and the connection portion 146. In the embodiment depicted in FIGS. 3A and 3B, the locking member 142 is positionable within the cavity 148 of the connection portion 146 when the lockable wheel 134 is aligned with the lockable leg 120, e.g., when the axle axis 131 extends in a direction orthogonal to the lockable leg 120.

Referring collectively to FIGS. 1 and 3A, in some embodiments, the cable 182 is coupled to a handle 180. In the embodiment depicted in FIGS. 1 and 3A, the handle 180 is coupled to the mast portion 102 and is coupled to the locking member 142 through the cable 182. The handle 180 is repositionable between an engaged position, in which the handle 180 moves the locking member 142 into the locked position, and a disengaged position, in which the handle 180 moves the locking member 142 into the unlocked position. As described above, the biasing member 144 may bias the locking member 142 in the vertical direction. In some embodiments, the biasing member 144 biases the locking member 142 into the cavity 148 (i.e., into the locked position), and the locking member 142 is moved into the unlocked position through movement cable 182 in the vertical direction via moving the handle into the disengaged position. In other embodiments, the biasing member 144 may bias the locking member out of the cavity 148 (i.e., into the unlocked position), and the locking member 142 is moved into the locked position through movement of the cable 182 in the vertical direction via moving the handle 180 into the engaged position.

Referring again to FIG. 1, by fixing the lockable wheel 134 with respect to the lockable leg 120 about the axis 132, the lateral movement of the subject support lift 100 may be restricted. More particularly, because the lockable wheel 134 is fixed with respect to the lockable leg 120 about the axis 132 with the locking member 142 (FIG. 3A) in the locked position, the lockable wheel 134 may be rotatable about the axle axis 131 (FIG. 3A), but may resist movement in the lateral direction as depicted. By resisting movement in the lateral direction, the lockable wheel 134 may reduce the force required to navigate the subject support lift 100 along a straight line in the longitudinal direction, reducing the burden placed on a caregiver to move the subject support lift 100 as desired when transporting a subject with the subject support lift 100. Furthermore, by resisting movement in the lateral direction, the lockable wheel 134 may provide a pivot point about which the rest of the subject support lift 100 may be rotated, which may assist a caregiver in navigating the subject support lift 100 as desired when transporting a subject with the subject support lift 100.

However, when lifting a subject with the subject support lift 100, it may be desirable for the lockable wheel 134 to be rotatable with respect to the lockable leg about the axis 132. In particular, as noted above, the subject support lift 100 includes the pivotable wheels 170 at the front end 162 and the rear end 164 of the pivotable leg 160, as well as at the rear end 124 of the lockable leg 120, each of which are rotatable about pivotable wheel axes 172 that extend in the vertical direction. Because the subject support lift 100 includes pivotable wheels 170 and the lockable wheel assembly 130 that are each rotatable about axes 172, 132 extending in the vertical direction, the subject support lift 100 may move freely in the lateral and the longitudinal directions through the rotation of the pivotable wheels 170 and the lockable wheel assembly 130. Free movement of the subject support lift 100 may be desirable when lifting a subject with the mast portion 102, such that the subject support lift 100 may be moved to align the sling bar 108 over a center of mass of the subject.

For example and referring to FIG. 2, the sling bar 108 defines a sling bar center of mass 109, and a subject to be moved with the subject support lift 100 may define a subject center of mass 12. When lifting the subject in the vertical direction through a sling, a vest, or the like coupled to the sling bar 108, it is desirable for the sling bar center of mass 109 to be positioned over the subject center of mass 12. In particular, once a subject is lifted off of a support surface (e.g., a bed, a chair, or the like), the subject center of mass 12 will move toward the sling bar center of mass 109 under the force of gravity. In other words, the subject will "swing" toward the sling bar center of mass 109, and may continue swinging until the subject center of mass 12 comes to rest underneath the sling bar center of mass 109. To reduce "swinging" the subject, it is desirable to align the sling bar center of mass 109 with the subject center of mass 12 before the subject is lifted off of the support surface.

With the subject support lift 100 freely movable in the longitudinal and the lateral direction, as the sling bar 108 moves upward in the vertical direction, the subject support lift 100 may be "pulled" toward the subject center of mass 12 until the sling bar center of mass 109 is positioned over the subject center of mass 109. Without being bound by theory, as the sling bar 108 moves upward in the vertical direction, the sling bar 108 (through a sling, a vest, or the like coupled to the sling bar 108 and attached to the subject) applies a force to the subject, which is resisted by an equal and opposite force applied to the sling bar 108 by the subject. The force applied to the sling bar 108 by the subject acts to pull the subject support lift 100 toward the subject center of mass 12. With the subject support lift 100 freely movable in the longitudinal direction, the subject support lift 100 moves toward the subject center of mass 12 under the force applied to the sling bar 108 by the subject (i.e., in a forward direction 14 and in a sideways lateral direction 16 as depicted), until the sling bar center of mass 109 is positioned over the subject center of mass 12. As the sling bar 108 continues to move upward, the subject may then be lifted off of a support surface (e.g., a bed, a chair, or the like) with the sling bar center of mass 109 positioned over the subject center of mass 12. In this way, a subject's "swinging" when being lifted by the subject support lift 100 may be minimized by utilizing a subject support lift 100 including pivotable wheels 170 and a lockable wheel assembly 130 that are each rotatable about axes 172, 132 extending in the vertical direction allowing the subject support lift 100 to move freely in the lateral and the longitudinal directions.

Accordingly, by including a selectively lockable wheel 134, the subject support lift 100 may be freely movable in the lateral and the longitudinal directions when lifting a subject so as to reduce swinging the subject as described above, and lateral movement of the subject support lift 100 may be restricted when moving a subject in the longitudinal direction with the subject support lift 100.

Figure 4:
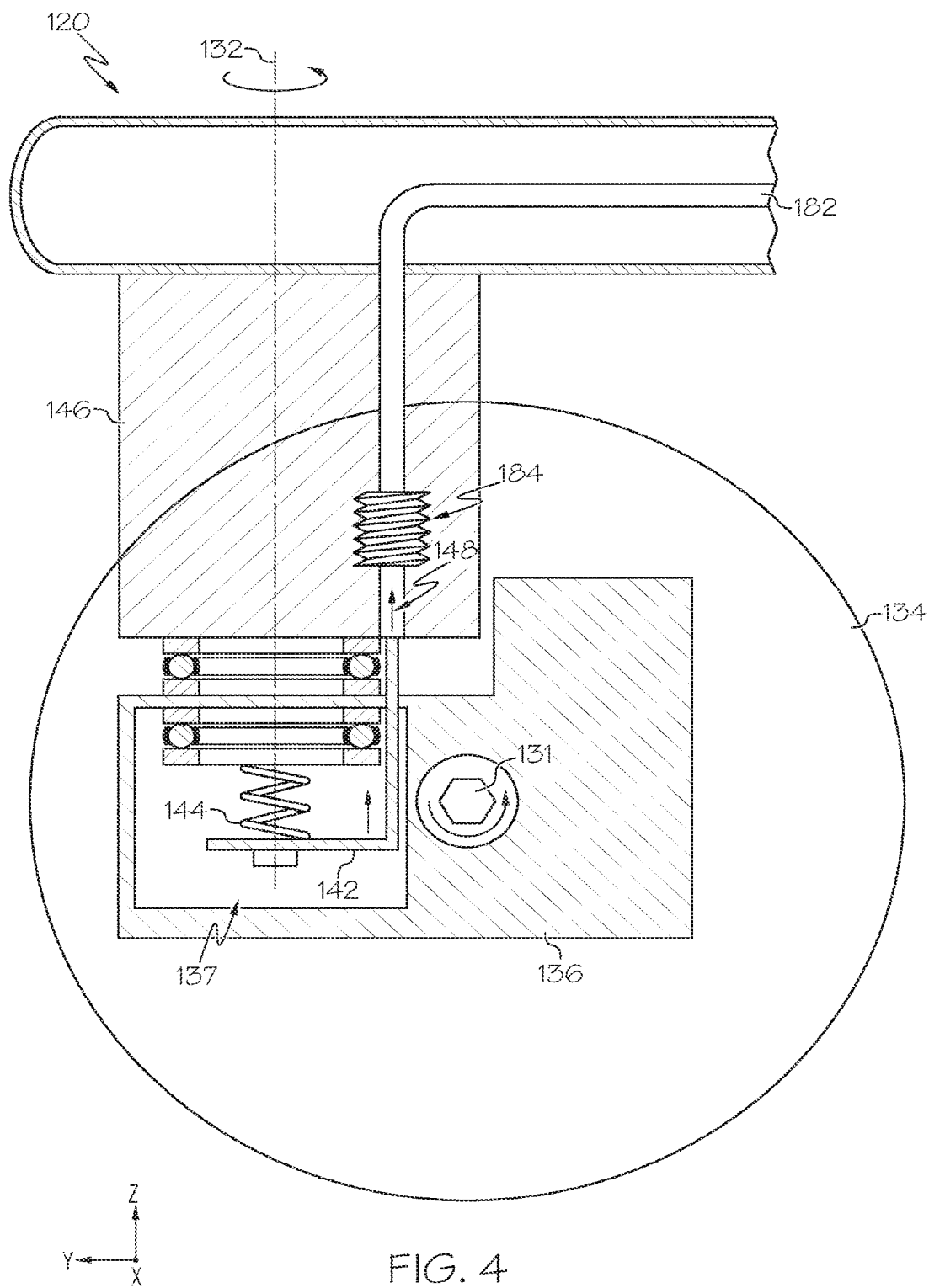
FIG. 4 schematically depicts a cross-section of another lockable wheel assembly of the subject support lift along section 4-4 of FIG. 2, according to one or more embodiments shown and described herein.

Referring to FIG. 4, a cross-section of another lockable wheel assembly 130 is depicted along section 4-4 of FIG. 2. The embodiment depicted in FIG. 4 includes the connection portion 146 including the cavity 148, the lockable wheel 134, and the axle member 136 including the axle cavity 137, similar to the embodiment described above with respect to FIGS. 3A and 3B. However, in the embodiment depicted in FIG. 4, the lockable wheel assembly 130 includes a solenoid 184 that moves the locking member 142 between the locked position and the unlocked position. Particularly, the solenoid 184 may be selectively charged with current to draw the locking member 142 upward in the vertical direction. In the embodiment depicted in FIG. 4, the cable 182 electrically couples the solenoid 184 to the handle 180 (FIG. 1). In this embodiment, the cable 182 may generally include a construction suitable for conducting electrical current, such as copper wiring or the like.

The lockable wheel assembly 130 further includes the biasing member 144 that biases the locking member 142 in the vertical direction. In the embodiment depicted in FIG. 4, the biasing member 144 may bias the locking member 142 downward in the vertical direction (i.e., into the unlocked position), and the solenoid 184 may move the locking member 142 into the locked position when charged with current. In other embodiments, the biasing member 144 may bias the locking member 142 upward into the cavity 148 (i.e., into the locked position), and the solenoid 184 may move the locking member 142 into the unlocked position when charged with current.

Figure 5A:
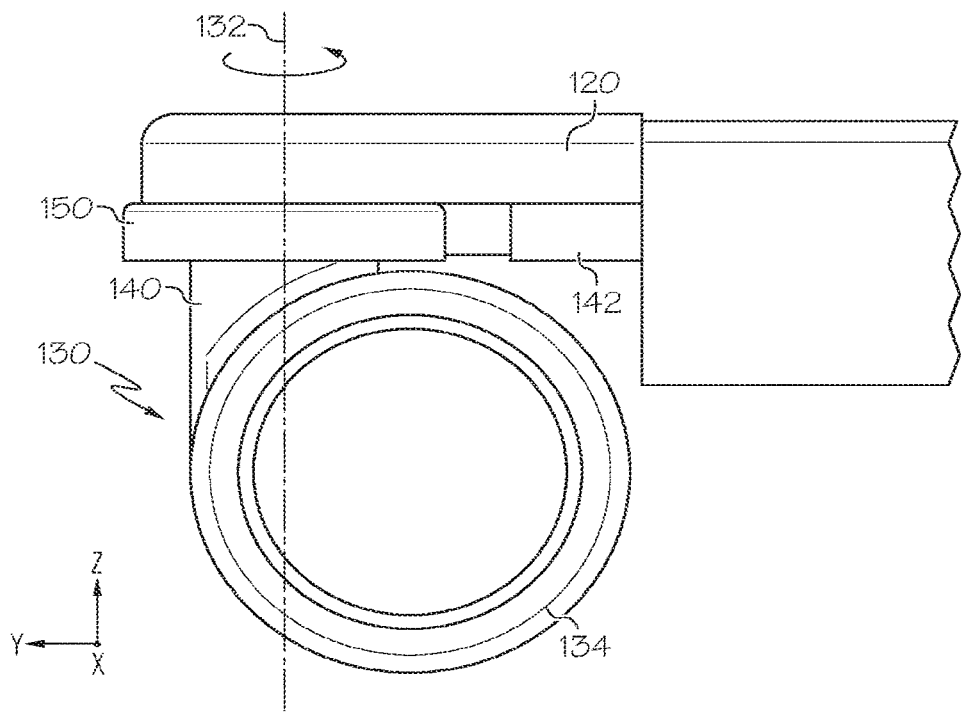
FIG. 5A schematically depicts a side view of another lockable wheel assembly of the subject support lift of FIG. 2, according to one or more embodiments shown and described herein.
Figure 5B:
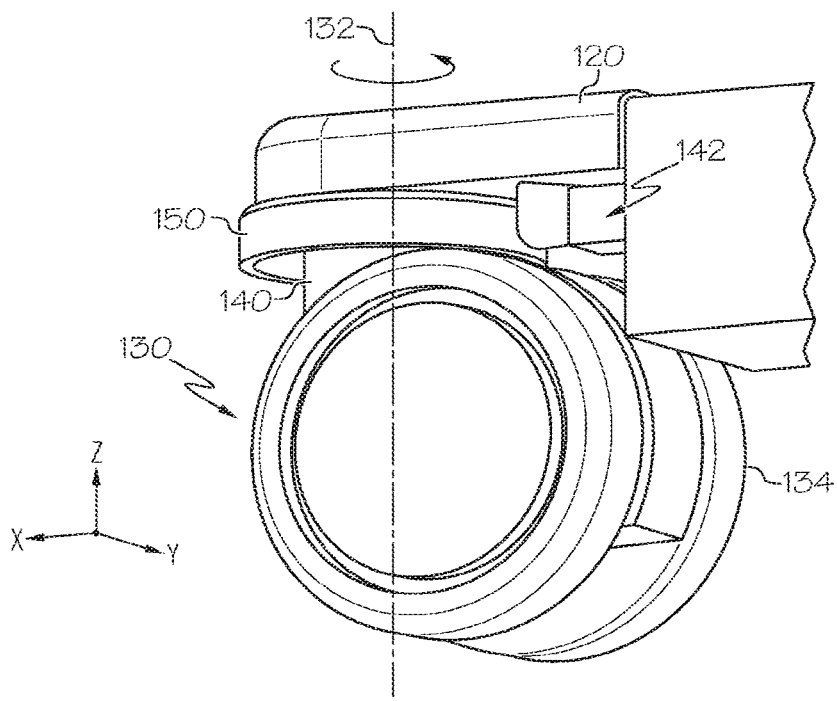
FIG. 5B schematically depicts a rear perspective view of the lockable wheel assembly of FIG. 5A, according to one or more embodiments shown and described herein.

Referring to FIGS. 5A and 5B, a side view and a lower perspective view of another lockable wheel assembly 130 is schematically depicted. The lockable wheel assembly 130 includes the lockable wheel 134 and the pivot member 140 coupled to the lockable leg 120. In the embodiment depicted in FIGS. 5A and 5B, the lockable wheel assembly 130 further includes a disc 150 that extends at least partially around the axis 132 of the lockable wheel assembly 130. In embodiments, the disc 150 is coupled to the lockable wheel 134, such that the disc 150 rotates about the axis 132 of the pivot member 140 with the lockable wheel 134.

The lockable wheel assembly 130 further includes the locking member 142 that is selectively engageable with the disc 150. In particular, in the embodiment depicted in FIGS. 5A and 5B, the locking member 142 is coupled to the lockable leg 120 and is extendable in the longitudinal direction to selectively engage the disc 150. When extended, the locking member 142 engages the disc 150, such that the disc 150, and accordingly the lockable wheel 134, are fixed with respect to the lockable leg 120 about the axis 132. When retracted, the locking member 142 is spaced apart from the disc 150, such that the disc 150, and accordingly the lockable wheel 134, are rotatable with respect to the lockable leg 120 about the axis 132. In embodiments, the locking member 142 may be coupled to the handle 180 (FIG. 1) through a cable 182 (FIG. 3A) and the locking member 142 may be extended and retracted (i.e., moved between the locked position and the unlocked position) via movement of the handle 180 (FIG. 1) between the engaged position and the disengaged position.

Figure 6:
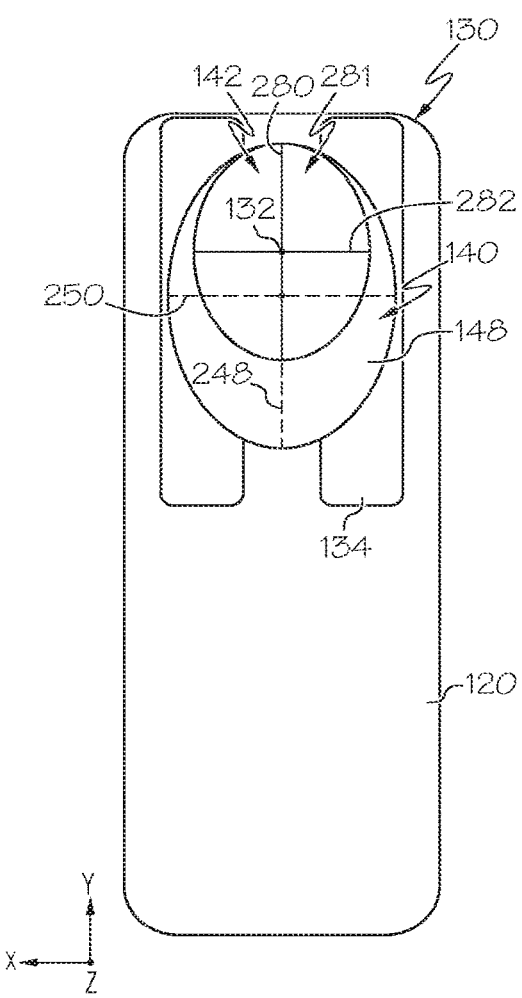
FIG. 6 schematically depicts a top view of another lockable wheel assembly of the subject support lift along section 6-6 of FIG. 1, according to one or more embodiments shown and described herein.

Referring now to FIG. 6, a cross section of another lockable wheel assembly 130 along section 6-6 of FIG. 1 is schematically depicted. In the embodiment depicted in FIG. 6, the pivot member 140 defines the cavity 148, and locking member 142 of the lockable wheel assembly 130 includes a turnable axle 281 positioned within the cavity 148. The turnable axle 281 is coupled to the lockable wheel 134 and generally includes an elliptical shape having a turnable axle major axis 280 and turnable axle minor axis 282. The cavity 148 similarly includes an elliptical shape having a cavity major axis 248 and a cavity minor axis 250. In embodiments, a length of the turnable axle major axis 280 is less than a length of the cavity minor axis 250, such that the turnable axle 281 is rotatable within the cavity 148. Furthermore, the turnable axle 281 is coupled to the lockable wheel 134 such that the turnable axle 281 rotates with the lockable wheel 134 with respect to the cavity 148 about the axis 132.

The turnable axle 281 may move within the cavity 148 in the longitudinal and/or the lateral directions. When the subject support lift 100 (FIG. 1) is moving forward in the longitudinal direction (i.e., in the +y-direction as depicted), the turnable axle 281 may be positioned in a front end of the cavity 148 such that the turnable axle major axis 280 and the cavity major axis 248 are aligned and the turnable axle minor axis 282 is positioned forward of the cavity minor axis 250 in the longitudinal direction. With the turnable axle major axis 280 and the cavity major axis 248 aligned and with the turnable axle 281 positioned in the front end of the cavity 148, rotation of the lockable wheel 134 about the axis 132 may be restricted. More particularly, with the turnable axle 281 positioned within the front portion of the cavity 148, the turnable axle 281 may be bounded by the elliptical shape of the cavity 148, restricting rotation of the turnable axle 281, and accordingly the lockable wheel 134, about the axis 132. In this manner, the turnable axle 281 may be positioned in the locked position when the subject support lift 100 (FIG. 1) is moving forward in the longitudinal direction.

Figure 7A:
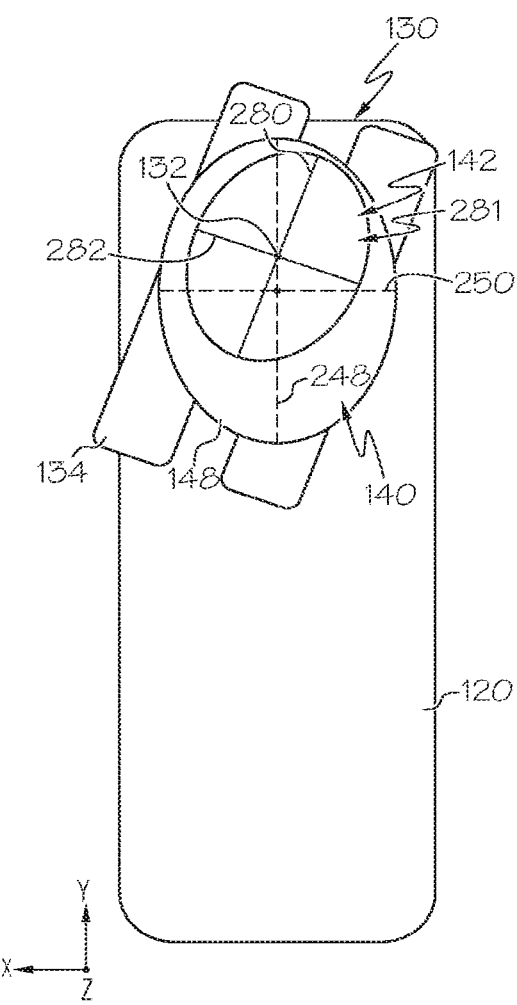
FIG. 7A schematically depicts a top view of the lockable wheel assembly of FIG. 6 rotating about an axis, according to one or more embodiments shown and described herein.
Figure 7B:
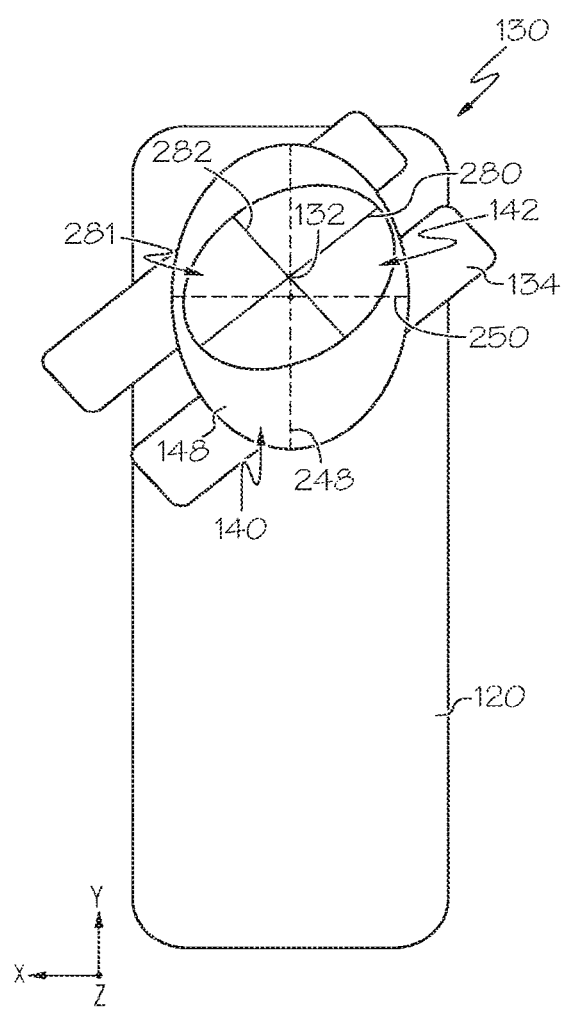
FIG. 7B schematically depicts a top view of the lockable wheel assembly of FIG. 6 continuing to rotate about the axis, according to one or more embodiments shown and described herein.
Figure 7C:
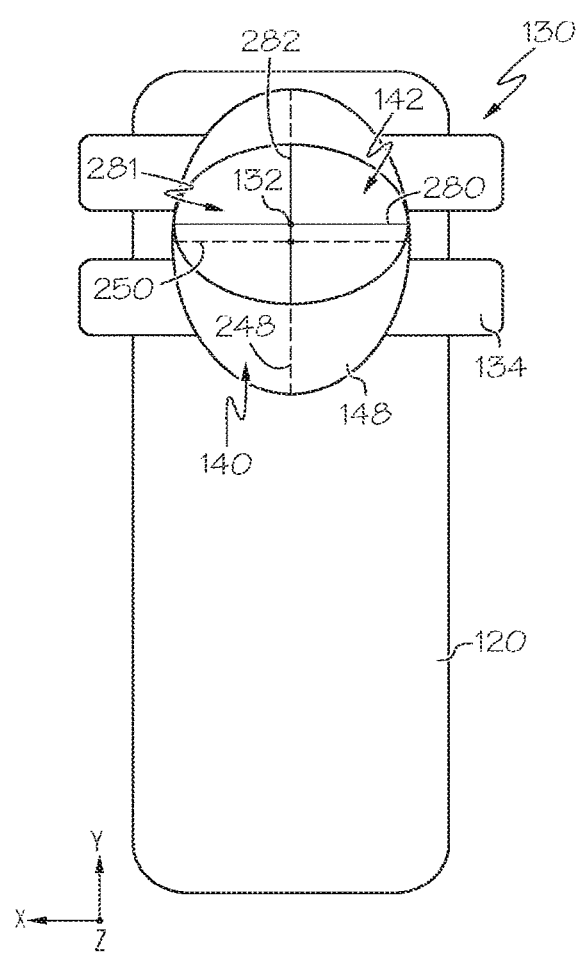
FIG. 7C schematically depicts a top view of the lockable wheel assembly of FIG. 6 moving oriented in a lateral direction, according to one or more embodiments shown and described herein.

Referring collectively to FIGS. 7A-7C, the turnable axle 281 is depicted progressively rotating about the axis 132 until the lockable wheel 134 is oriented in the lateral direction. More particularly, as depicted in FIG. 7A, the turnable axle 281 may be moved rearward within the cavity 148 in the longitudinal direction (i.e., in the −y-direction as depicted). In embodiments, the turnable axle 281 may be moved rearward within the cavity 148 when the subject support lift 100 (FIG. 1) ceases moving forward in the longitudinal direction (i.e., in the +y-direction as depicted), and/or by moving the subject support lift 100 (FIG. 1) rearward in the longitudinal direction (i.e., in the −y-direction as depicted). As the turnable axle 281 moves rearward within the cavity 148, the turnable axle 281 may no longer be bounded by the elliptical shape of the cavity 148, allowing rotation of the turnable axle 281, and accordingly the lockable wheel 134, about the axis 132. As noted above, the length of the turnable axle major axis 280 may be less than the length of the cavity minor axis 250, such that the turnable axle 281 may be fully rotatable about the axis 132 when the turnable axle 281 is positioned at the center of the cavity 148. In this way, the turnable axle 281 may be repositioned between the locked position and the unlocked position by moving the turnable axle 281 forward and rearward in the longitudinal direction within the cavity 148. Because the turnable axle 281 is positioned in the locked position when the subject support lift 100 (FIG. 1) is being moved forward in the longitudinal direction, similar to the embodiments described above, the lockable wheel assembly 130 may assist in resisting lateral movement of the subject support lift 100 (FIG. 1) when the subject support lift 100 is being moved forward in the longitudinal direction.

Accordingly, it should now be understood that embodiments according to the present disclosure include subject support lifts including lockable wheel assemblies. The lockable wheel assemblies generally include a locking member and a lockable wheel pivotally coupled to a lockable leg of the subject support at the pivot member, where locking member is repositionable between an unlocked position, in which the lockable wheel is rotatable with respect to the lockable leg about an axis extending through the pivot member in the vertical direction, and a locked position, in which the lockable wheel is fixed with respect to the lockable leg at the pivot member. Because locking member is selectively repositionable between a locked position and an unlocked position, the lockable wheel may be rotatable when lifting a subject, so that the subject support lift may freely move to position the subject support lift over the center of mass of the subject. The wheel may also be fixed with respect to the leg of the subject support lift in the locked position to resist movement of the lift in a lateral direction when moving the subject from one location to another.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed:

1. A subject support lift comprising a mast portion, a base portion, and a lockable wheel assembly coupled to the base portion, the lockable wheel assembly comprising:
   a pivot member defining a cavity comprising an elliptical shape having a cavity major axis and a cavity minor axis;
   a lockable wheel pivotally coupled to the pivot member; and
   a locking member comprising a turnable axle positioned within the cavity and coupled to the lockable wheel, the turnable axle comprising an elliptical shape having a turnable axle major axis and a turnable axle minor axis, the locking member being repositionable between a locked position and an unlocked position, the lockable wheel being rotatable with respect to the pivot member about an axis extending through the pivot member in a vertical direction with the locking member in the unlocked position, and the lockable wheel being fixed with respect to the pivot member about the axis extending through the pivot member with the locking member in the locked position.

2. The subject support lift of claim 1, wherein the turnable axle major axis is aligned with the cavity major axis in the locked position and the turnable axle minor axis is positioned forward of the cavity minor axis in a longitudinal direction that is transverse to the vertical direction.

3. The subject support lift of claim 1, wherein a length of the turnable axle major axis is less than a length of the cavity minor axis.

4. The subject support lift of claim 1, wherein, when the turnable axle major axis is aligned with the cavity major axis and the turnable axle is positioned in a front end of the cavity, rotation of the lockable wheel about the axis extending through the pivot member is restricted.

5. A subject support lift comprising:
   a mast portion extending upward in a vertical direction; and
   a base portion positioned at a bottom end of the mast portion, the base portion comprising:
      a lockable leg extending between a front end and a rear end;
      a lockable wheel assembly coupled to the lockable leg, the lockable wheel assembly comprising:
         a pivot member coupled to the lockable leg, the pivot member defines a cavity comprising an elliptical shape having a cavity major axis and a cavity minor axis;
         a lockable wheel pivotally coupled to the lockable leg at the pivot member; and
         a locking member comprising a turnable axle positioned within the cavity and coupled to the lockable wheel, the turnable axle comprising an elliptical shape having a turnable axle major axis and a turnable axle minor axis, the locking member being repositionable between a locked position and an unlocked position, the lockable wheel being rotatable with respect to the lockable leg about an axis extending through the pivot member in the vertical direction with the locking member in the unlocked position, and the lockable wheel being fixed with respect to the lockable leg about the axis extending through the pivot member with the locking member in the locked position.

6. The subject support lift of claim 5, wherein the lockable wheel is coupled to the front end of the lockable leg.

7. The subject support lift of claim 5, further comprising a handle coupled to the mast portion, wherein the locking member of the lockable wheel assembly is coupled to the handle.

8. The subject support lift of claim 5, wherein the turnable axle major axis is aligned with the cavity major axis in the locked position and the turnable axle minor axis is positioned forward of the cavity minor axis in a longitudinal direction that is transverse to the vertical direction.

9. The subject support lift of claim 5, wherein a length of the turnable axle major axis is less than a length of the cavity minor axis.

10. The subject support lift of claim 5, wherein, when the turnable axle major axis is aligned with the cavity major axis and the turnable axle is positioned in the front end of the cavity, rotation of the lockable wheel about the axis is restricted.

11. The subject support lift of claim 5, wherein the base portion further comprises a pivotable leg positioned opposite the lockable leg and extending between a front end and a rear end positioned opposite the front end in a longitudinal direction that is transverse to the vertical direction, wherein the pivotable leg is repositionable between a retracted position and an extended position, and wherein the front end of the pivotable leg is positioned closer to a subject support lift centerline in the retracted position than the extended position; and a pivotable wheel coupled to the pivotable leg, the pivotable wheel being rotatable with respect to the pivotable leg about a pivotable wheel axis extending in the vertical direction.

12. A method for supporting a subject with a subject support lift, the method comprising:

moving the subject support lift toward the subject, the subject support lift comprising a mast portion and a base portion, the base portion comprising a lockable leg and a lockable wheel pivotally coupled to the lockable leg;

moving the lockable leg outward from a subject support lift centerline;

connecting the subject to the subject support lift;

lifting the subject with the subject support lift in a vertical direction;

locking the lockable wheel in a locked position such that the lockable wheel is fixed with respect to the lockable leg about an axis extending in the vertical direction, wherein locking the lockable wheel comprises aligning a turnable axle major axis of a turnable axle coupled to the lockable wheel and comprising an elliptical shape, with a cavity major axis of a cavity defined by a connection portion coupled to the lockable leg and comprising an elliptical shape; and moving the subject connected to the subject support lift in a direction transverse to the vertical direction.

13. The method of claim 12, further comprising, prior to lifting the subject with the subject support lift, unlocking the lockable wheel such that the lockable wheel is rotatable about the axis.

14. The method of claim 12, wherein lifting the subject further comprises moving the subject support lift in at least one of a longitudinal direction and a lateral direction that are transverse to the vertical direction to align a center of mass of a sling bar coupled to the mast portion of the subject support lift with a center of mass of the subject.

15. The method of claim 12, wherein, when in the locked position, a turnable axle minor axis is positioned forward of a cavity minor axis in a longitudinal direction that is transverse to the vertical direction.

16. The method of claim 12, wherein a length of the turnable axle major axis is less than a length of a cavity minor axis.

* * * * *